US007250205B1

(12) United States Patent
Suda et al.

(10) Patent No.: US 7,250,205 B1
(45) Date of Patent: Jul. 31, 2007

(54) BACKING SHEET, AND SYSTEM AND METHOD OF FABRICATION THEREOF

(75) Inventors: David Suda, Warrington, PA (US); Tom Cuthbertson, Royersford, PA (US); Mark Buscher, Pine Hill, NJ (US); Larry Clevenstine, Trevose, PA (US)

(73) Assignee: Certainteed Corporation, Valley Forge, PA (US)

( * ) Notice: Subject to any disclaimer, the term of this patent is extended or adjusted under 35 U.S.C. 154(b) by 1299 days.

(21) Appl. No.: 09/675,180

(22) Filed: Sep. 29, 2000

(51) Int. Cl.
*B32B 3/04* (2006.01)

(52) U.S. Cl. .................. 428/124; 428/343; 428/139; 428/138; 428/130; 428/126; 428/121; 52/406.2; 52/404.1; 52/406.1; 604/385.2; 156/213

(58) Field of Classification Search ............... 428/121, 428/343, 139, 138, 124, 130, 126; 604/385.2; 156/213; 52/406.2, 404.1, 406.1
See application file for complete search history.

(56) References Cited

U.S. PATENT DOCUMENTS

| 4,259,958 | A |   | 4/1981  | Goodbar |              |
|-----------|---|---|---------|---------|--------------|
| 4,387,125 | A |   | 6/1983  | Adell   | 428/31       |
| 4,621,777 | A |   | 11/1986 | O'Connor| 242/1        |
| 4,952,441 | A |   | 8/1990  | Bose et al. | 428/121  |
| 5,591,521 | A | * | 1/1997  | Arakawa et al. | 428/352 |
| 5,685,938 | A |   | 11/1997 | Knapp et al. | 156/213 |
| 5,713,885 | A | * | 2/1998  | Jorgenson et al. | 604/385 |
| 5,730,739 | A |   | 3/1998  | Lavash et al. |        |
| 5,780,150 | A | * | 7/1998  | Bloch et al. | 428/350 |
| 6,100,513 | A | * | 8/2000  | Jackson et al. | 219/727 |

* cited by examiner

*Primary Examiner*—Raymond Alejandro
*Assistant Examiner*—Jane Rhee
(74) *Attorney, Agent, or Firm*—Oblon, Spivak, McClelland, Maier & Neustadt, P.C.

(57) ABSTRACT

A backing sheet, and a system and method of manufacturing a backing sheet with stapling tabs. The system includes a roller device configured to apply an adherent material to a first side of the backing sheet continuously fed from a feed roll. The sheet is then fed to a first pair of folders configured to fold the backing sheet along the edges such that the adherent material holds the first fold in place. The sheet passes through a second pair of folders that form a second fold along the edges of the sheet by folding in the opposite direction as in the first fold. Advantageously, an applicator device is configured to apply a tacky substance, such as a starch solution, between the contacting portions of the second fold, prior to the formation of the second fold. The tacky substance maintains the second fold and prevents the stapling tab from opening during further manufacturing and packaging processes. Alternatively, the system includes a piercing device configured to piece a hole through the backing sheet in order to allow a portion of adherent material to leak through the hole and contact a portion of the backing sheet. Once the second fold is made, the portion of adherent material extending through the hole will contact a portion of the backing sheet and will adhere to the portion of the backing material it contacts, and thereby prevent the stapling tab from opening during the remaining manufacturing and packaging processes.

4 Claims, 4 Drawing Sheets

BACKING SHEET, AND SYSTEM AND METHOD OF FABRICATION THEREOF

BACKGROUND OF THE INVENTION

1. Field of the Invention

The present invention relates generally to a backing sheet, as well as, a system and method of fabricating a backing sheet. More specifically, the present invention relates backing sheets having stapling tabs.

2. Discussion of the Background

Conveyor belt systems are typically used during the manufacture of various products to move the product from one processing station to another. One problem that arises with the use of conveyor belt systems is that if the product becomes caught on the edge of a conveyor belt then the product may become damaged. For example, fiberglass insulation can be manufactured with a backing sheet having a stapling tab on both edges of the sheet. The stapling tabs are configured to be utilized during the installation of the fiberglass insulation by placing the insulation between structural support members, folding the tabs outward into an open position, and stapling the tabs to the structural support members to fix the insulation in place. However, such stapling tabs present a problem during the manufacturing and packaging of the fiberglass insulation. The inventors of the present invention have observed that the stapling tabs are typically placed on the conveyor belts facing downward and therefore have a tendency to hang over and become caught on the edge of the conveyor belts. Once the stapling tabs are caught on the edges of the conveyor belts they become torn off of the backing sheet as the insulation moves from one conveyor belt to another. Once the stapling tab is torn, the damaged section of insulation must be removed from the manufacturing process and discarded, in order to insure that the damaged product is not shipped to the customer.

The stapling tabs also present a problem during the packaging of the fiberglass insulation. During packaging several sheets of fiberglass insulation are typically stacked one on top of another, then the stack is compressed and stuffed into a packaging bag. The insulation is typically stacked by positioning and dropping one sheet of insulation on top of another. As the sheet of insulation is dropped, the air beneath the falling sheet has a tendency to catch the stapling tabs and pull them open like a parachute as the sheet descends. The opened stapling tabs can then become folded or crushed when the sheets are stacked and packaged. The folded or crushed stapling tabs are difficult to use during the installation process, and have a shoddy appearance which gives the consumer a negative impression of the product.

Based upon the above observations by the inventors of the present invention, the inventors have determined that a novel backing sheet having stapling tabs is needed that will overcome the disadvantages discussed above.

SUMMARY OF THE INVENTION

An object of the present invention is to provide a backing sheet and a system and method of making a backing sheet having a stapling tab that remains fixed to an adjacent portion of the backing sheet during manufacturing and packaging. By insuring that the stapling tabs remains in a fixed position during manufacturing and packaging, the stapling tabs can be prevented from being caught and torn by the conveyor belt and prevented from opening during stacking of the sheets of insulation.

A further object of the present invention is to provide a backing sheet and a system and method of making a backing sheet having a stapling tab that is not permanently fixed to adjacent portion of the backing sheet such that the installer of the insulation can easily open the stapling tab during installation.

The present invention advantageously provides a system and method of manufacturing a backing sheet with stapling tabs that remain in a closed position during manufacturing and packaging, yet are easy to open during installation of the fiberglass insulation. The backing sheet of the present invention can be attached to a sheet of fiberglass material to form fiberglass insulation that is configured for installation between the structural beams within a wall. The system includes a roller device configured to apply an adherent material to a first side of the backing sheet. The backing sheet is generally continuously fed from a feed roll and moved over the roller device and is then fed to a first pair of folders (one folder for each edge) in order to begin the formation of a stapling tab along the edges of the backing sheet. The first folders are configured to fold the backing sheet in a first fold such that a first portion of the first side is bent downwards and contacts a second portion of the first side. The first portion and the second portion of the first side are then held together by a portion of a layer of the adherent material on the first side of the backing sheet. The backing sheet passes through the first pair of folders and travels towards a second pair of folders (one folder for each edge), in order to complete the formation of the stapling tab. The second folders are configured to fold the backing sheet in a second fold such that a first portion of the second side is bent upwards and contacts a second portion of the second side.

Notice that without any type of means for joining the first portion of the second side to the second portion of the second side, the stapling tab would be prone to open and unfold along the second fold during the manufacturing processes occurring downstream, such as the feeding of the insulation on conveyor belts and the movement of the insulation during packaging processes. Accordingly, the present invention advantageously includes at least one applicator device configured to apply a tacky substance to a portion of a second side of the backing material. The applicator device is configured to apply the tacky substance to the backing material at a location between the first pair of folders and the second pair of folders, and preferably downstream of any additional rollers that might be positioned between the first and second folders. One embodiment of the applicator device include a spray nozzle configured to spray a layer of a tacky substance on a portion of the second side of the backing sheet. A second embodiment of the system an applicator device with a roller configured to roll a layer of tacky substrate on a portion of the second side of the backing sheet. The layer of the tacky substance is sandwiched between the first portion and the second portion of the second side of the backing sheet.

The tacky substance is preferably a starch solution, although alternative materials can be used. The material used should provide at least a minimal level of adhesion between the stapling tab and the adjacent portion of the backing sheet such that the stapling tab remains fixed to the adjacent portion of the backing sheet during manufacturing and packaging, yet is not permanently fixed to adjacent portion of the backing sheet such that the installer of the insulation can easily unfold the second fold thereby opening the stapling tabs during installation. The concentration of the material can be varied depending upon the length of the assembly line used during the manufacturing and packaging of the insulation, and the length of time the insulation is handled during manufacturing and packaging. If the insulation is going to be frequently handled for a long period of time after the second fold is formed, then a higher concentration of tacky material in the solution will be required in order to insure that the stapling tab remains fixed to the adjacent portion of the backing sheet during the manufacturing and packaging process. The amount of tacky material being sprayed depends upon the desired level of fixation between the stapling tab and the adjacent portion of the backing sheet, and on the line speed of the assembly line (i.e. the speed at which the backing sheet is being fed along the assembly line). The use of a heated roller after the second folders perform the second fold will help insure that the tacky material is dried and set during the remainder of the manufacturing and packaging process. The fiberglass material is then positioned on top of the first side of the backing sheet such that the adherent layer joins the fiberglass material to the backing sheet to form the fiberglass insulation. The fiberglass insulation continues along a conveyor system towards any further manufacturing process areas and packaging areas.

A third embodiment of a system and method of manufacturing a backing sheet includes a piecing device in place of or in addition to the applicator device of the first and second embodiments. The piercing device is configured to piece a hole through the backing sheet in order to allow a portion of adherent material in the adherent material layer to leak through the hole and contact a portion of the backing sheet. The hole is pierced by punching or cutting a portion of material from the backing sheet to form the hole, or by poking a sharp point through the backing sheet without removing any material or only slightly removing some material from the backing sheet. Preferably the piercing device is located upstream in the system of the roller applying the adherent material, therefore, as the backing sheet travels over the roller, adherent material applied to the first side of the backing sheet will seep or leak through the hole and a portion of the adherent material will extend slightly above the second side. Once the second fold is made, the portion of adherent material extending through the hole will contact a portion of the backing sheet and will adhere to the portion of the backing material it contacts, and thereby prevent the stapling tab from opening during the remaining manufacturing and packaging processes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
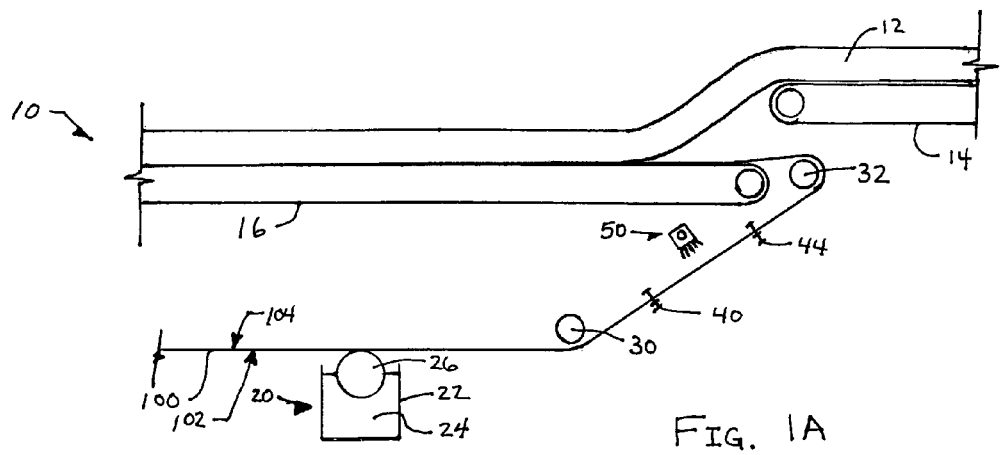
FIG. 1A is a side schematic view of a first embodiment of a system and method of manufacturing a backing sheet for insulation according to the present invention.
Figure 1B:
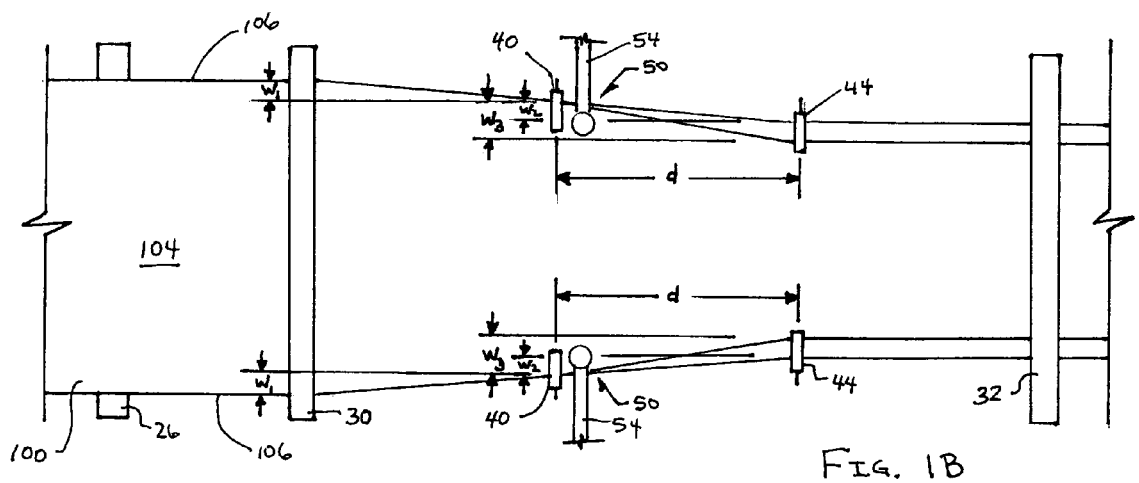
FIG. 1B is a top schematic view of the first embodiment of FIG 1A.
Figure 1C:
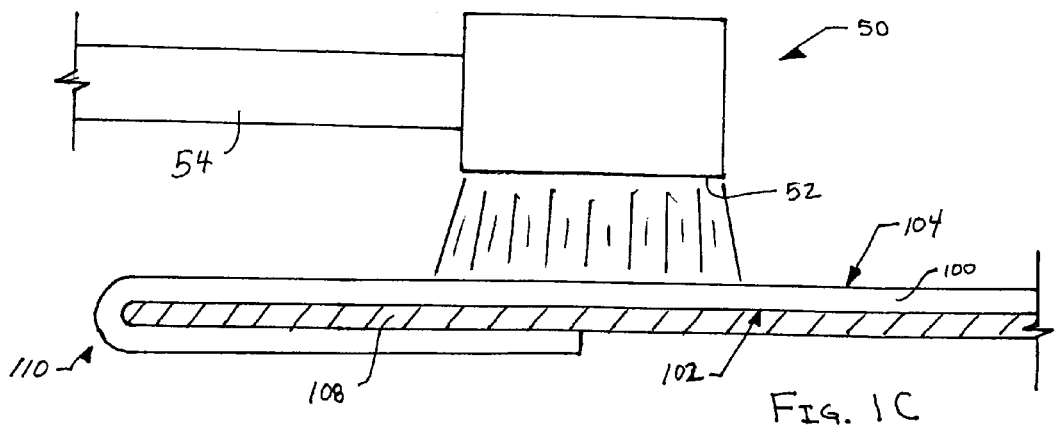
FIG. 1C is a partial front view of a spray applicator device of the first embodiment of FIG 1A.
Figure 2:
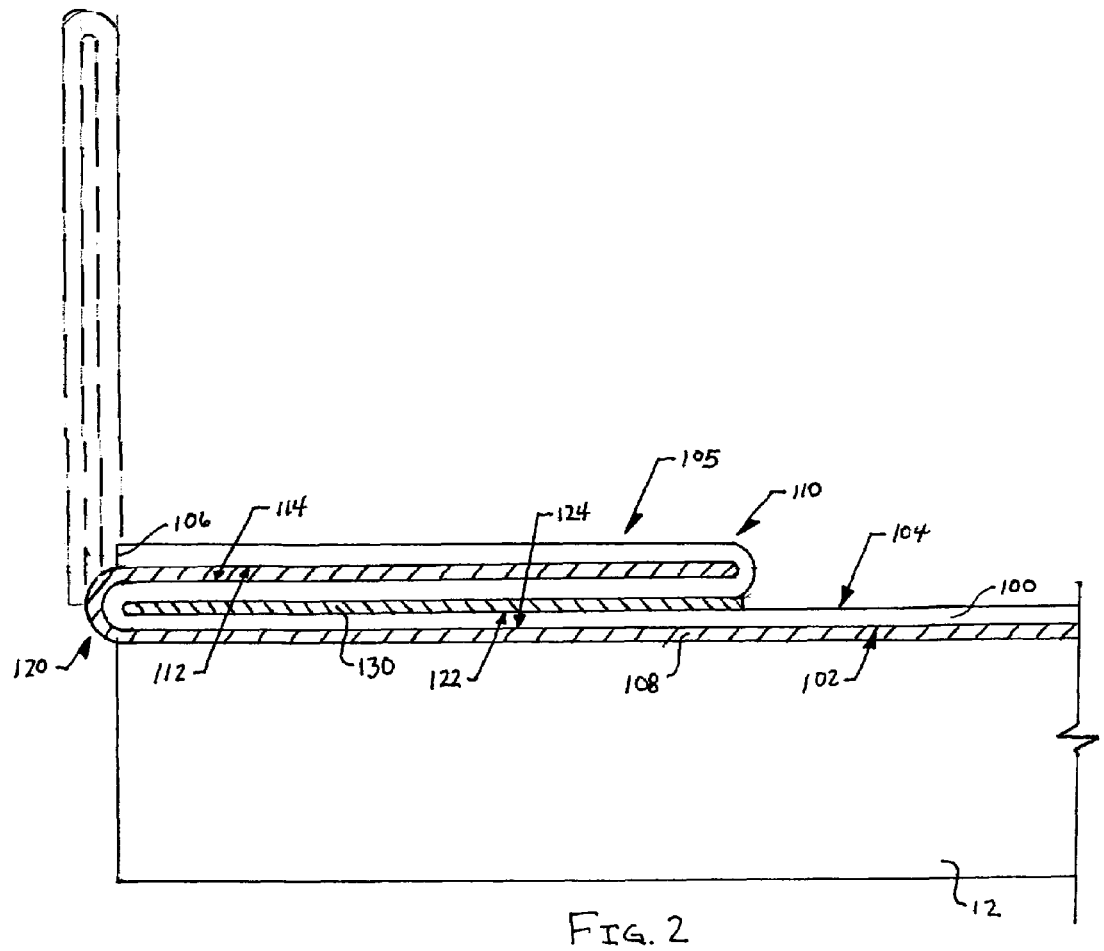
FIG. 2 is an embodiment of a backing sheet according to the present invention.
Figure 3:
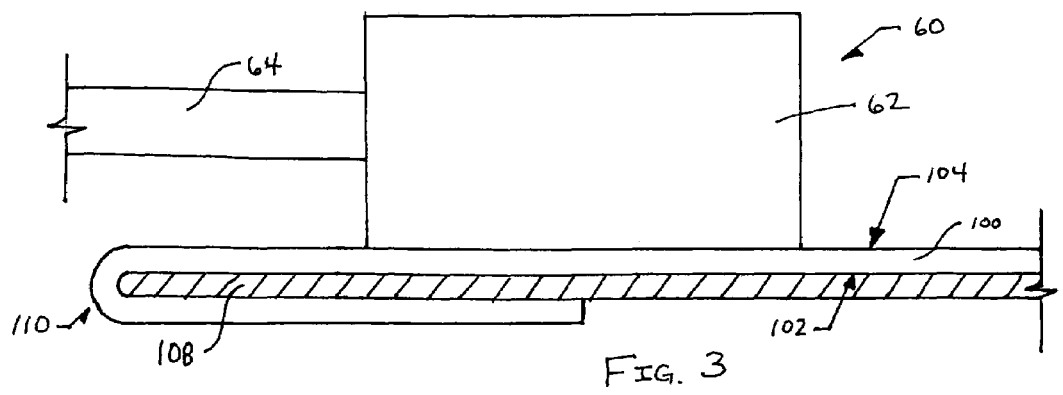
FIG. 3 is a partial front view of a roller applicator device of a second embodiment of a system and method of manufacturing a backing sheet for insulation according to the present invention.
Figure 4A:
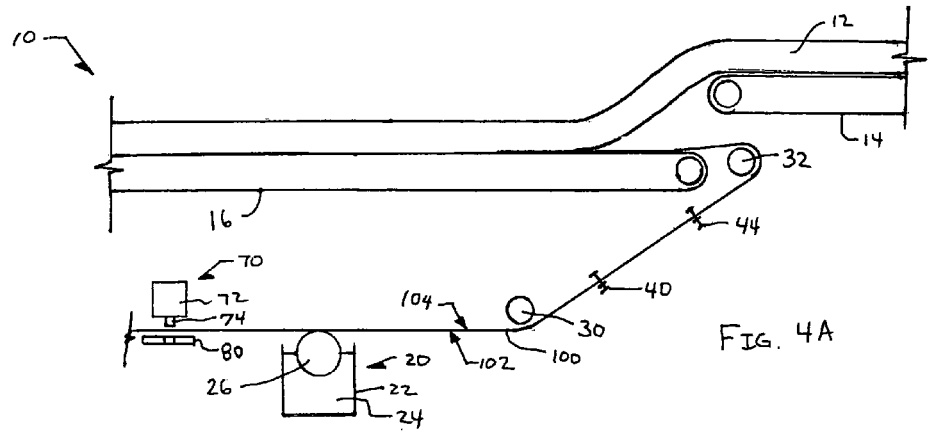
FIG. 4A is a side schematic view of a third embodiment of a system and method of manufacturing a backing sheet for insulation according to the present invention.
Figure 4B:
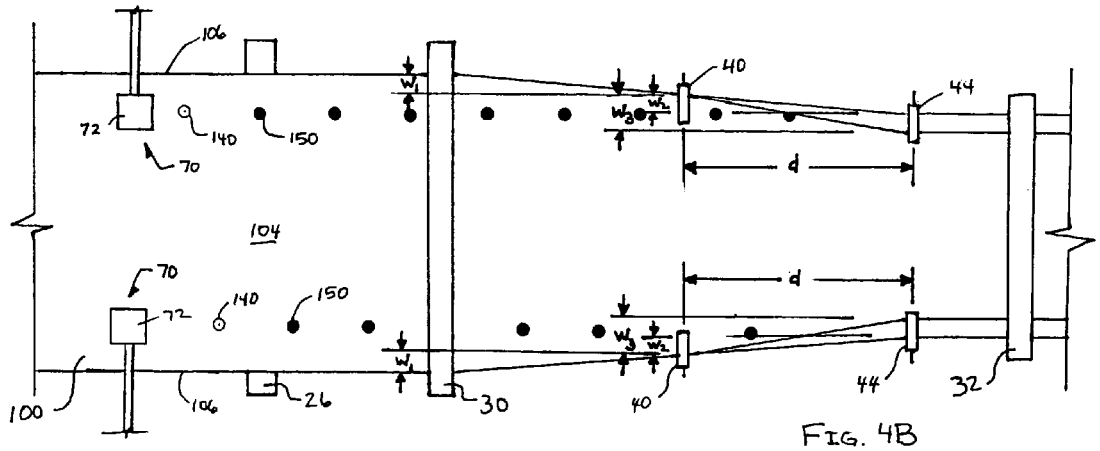
FIG. 4B is a top schematic view of the third embodiment of FIG. 4A.
Figure 4C:
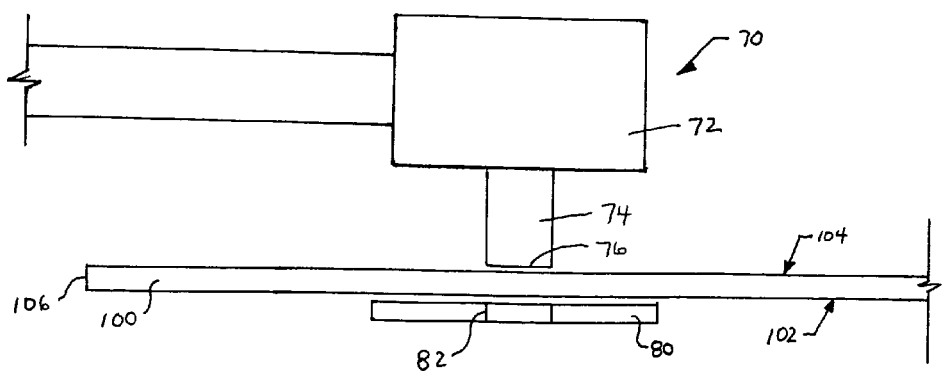
FIG. 4C is a partial front view of a piercing device of the third embodiment of FIG. 4A.
Figure 5:
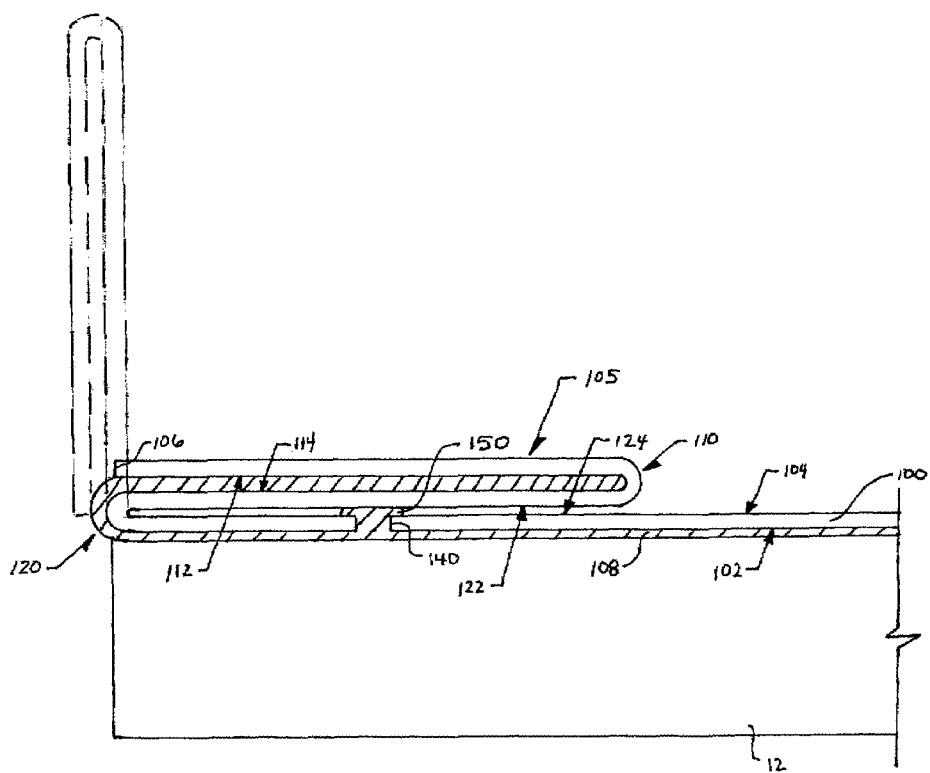
FIG. 5 is an alternative embodiment of a backing sheet according to the present invention.

Referring now to the drawings, where like reference numerals identify the same or corresponding parts throughout the several views, FIGS. 1A through 1C depict a first embodiment and FIG. 3 depicts a second embodiment of a system and method of manufacturing a backing sheet for insulation according to the present invention. FIG. 2 depicts an embodiment of a backing sheet according to the present invention, which can be produced, for example, by the first and second embodiments depicted in FIGS. 1A through 1C and FIG. 3. Additionally, FIGS. 4A through 4C depict a third embodiment of a system and method of manufacturing a backing sheet for insulation according to the present invention, and FIG. 5 depicts is an alternative embodiment of a backing sheet according to the present invention, which can be produced, for example, by the third embodiment depicted in FIGS. 4A through 4C.

FIGS. 1A through 1C depict a first embodiment of a system and method of manufacturing a backing sheet according to the present invention. Specifically, FIG. 1A depicts a side schematic view of section of a system 10 used to manufacture a backing sheet 100. This embodiment of the present invention is particularly well suited for manufacturing a backing sheet that can be attached to a sheet of fiberglass material 12 to form fiberglass insulation that is configured for installation between the structural beams within a wall. The method and system of the present invention forms one portion of the manufacturing process used to construct the fiberglass insulation. FIG. 2 depicts is an embodiment of a backing sheet 100 according to the present invention, which can be produced, for example, by the system and method depicted in FIGS. 1A through 1C.

The system 10 of the first embodiment includes a roller device 20 configured to apply an adherent material 24 to a first side 102 of the backing sheet 100. The roller device 20 generally includes a reservoir 22 containing a liquid adherent material 24, such as asphalt or some other material that is used to adhere the fiberglass material 12 to the backing sheet 100. The reservoir 22 may be configured to include a heating device (not depicted) in order to maintain the adherent material 24 housed therein in a liquid state and prevent the adherent material 24 from becoming too viscous. The roller device 20 further includes a roller 26, which is partially immersed in the adherent material 24 within the reservoir 22 and used to apply the adherent material 24 in a controlled manner to the first side 102 of the backing sheet. The backing sheet 100 is generally continuously fed from a feed roll (not depicted) and moved over the roller 26 in a direction from left to right as viewed in FIG. 1A. The roller 26 rotates in a clockwise manner as viewed in FIG. 1A and feeds the adherent material 24 from the reservoir 24 to the first side 102 of the backing sheet 100 as the backing sheet 100 contacts the roller 26. A scraper device (not depicted)

can be positioned downstream of the roller 26 in order to scrap any excess adherent material 24 off the backing sheet 100, if so desired.

Once the adherent material 24 is applied to the first side 102 of the backing sheet 100, a second side 104 of the backing sheet 100 is fed over a roller 30 and then to a first pair of folders 40, as depicted in FIGS. 1A and 1C, in order to begin the formation of a stapling tab 105 along the edges of the backing sheet 100. The folders 40 are conventional folding devices that are stationary and are configured to fold the two opposite edges 106 of the backing sheet 100 by a predetermined amount. The folders 40 in the first embodiment are configured to fold the backing sheet 100 in a first fold 110 (see FIG. 2) such that a first portion 112 of the first side 102 is bent downwards and contacts a second portion 114 of the first side 102. The first portion 112 and the second portion 114 are then held together by a portion of a layer 108 of the adherent material on the first side 102 of the backing sheet 100. The folders 40 are positioned to form a first fold 110 at a location a predetermined width $w_1$ in from the edge 106 of the backing sheet 100. The actual folding of the first fold 110 generally begins at the roller 30 and is generally completed once the backing sheet 100 reaches the folders 40.

The backing sheet 100 passes through the first pair of folders 40 and travels towards a second pair of folders 44, in order to complete the formation of the stapling tab 105. The folders 44 are also conventional folding devices that are stationary and are configured to fold the two opposite edges of the first fold 110 of the backing sheet 100 by a predetermined amount. The folders 44 in the first embodiment are configured to fold the backing sheet 100 in a second fold 120 (see FIG. 2) such that a first portion 122 of the second side 104 is bent upwards and contacts a second portion 124 of the second side 104. The folders 44 are positioned to form a second fold 120 at a location a predetermined width $w_2$ in from the edge of the first fold 110 of the backing sheet 100. The actual folding of the second fold 120 generally begins at the folders 40 and is generally completed once the backing sheet 100 reaches the folders 44.

The first fold 110 of the present invention is formed in order to create a stapling tab 105 that does not have exterior adherent material thereon, since exterior adherent material would interfere with both the packaging of the insulation and the installation of the insulation. By doubling over the edge of the backing sheet using the first fold 110, the stapling tab 105 is also given added strength. Alternatively, the stapling tab can be constructed with a single fold, possibly by applying the adherent material only in a middle portion of the backing sheet, thereby leaving a predetermined width along the edges of the backing tab free from an adherent layer which can then act as the stapling tab.

Notice that without any type of means for joining the first portion 122 of the second side 120 to the second portion 124 of the second side 120, the stapling tab 105 would be prone to open and unfold along the second fold 120 during the manufacturing processes occurring downstream, such as the feeding of the insulation on conveyor belts and the movement of the insulation during packaging processes. Accordingly, the present invention advantageously includes an applicator device 50 configured to apply a tacky substance to a portion of a second side 104 of the backing material 100. The invention can include one applicator device configured to apply tacky substance to all, a portion of, or several separate portions of the backing sheet, or one or more separate applicator devices for each edge of the backing sheet.

The applicator device 50 is configured to apply the tacky substance to the backing material 100 at a location between the first pair of folders 40 and the second pair of folders 44, and preferably downstream of any additional rollers that might be positioned between folders 40 and folders 44. The present invention preferably includes a pair of applicator devices 50, one for each edge of the backing sheet 100. The applicator devices 50 include a spray nozzle 52 and a supply tube 54. The applicator devices 50 can also include a filter in series with the nozzle 52 and can be configured to utilize compressed air as a means for spraying the tacky substance. The nozzle 52 can be provided with any type of configuration to provide any type of spray pattern, although a spray pattern that provides a uniform distribution of tacky substance on the backing sheet 10 is preferred. The applicator devices 50 are positioned to spray a layer 108 of a tacky substance on portions of the second side 104 of the backing sheet 100.

The applicator devices 50 are preferably configured to spray a mist, stream, or dispersed stream of the tacky substance onto the second side 104 of the backing sheet 100 within a defined area. The applicator devices 50 are preferably configured to spray the tacky substance within the area defined by a predetermined width $w_3$ in from the edge of the first fold 110 of the backing sheet 100, and generally in the distance d between the folders 40 and the folders 44. The width $w_3$ is generally defined as twice the width $w_2$ of the second fold. The applicator devices 50 can be configured to spray the tacky substance at any location within this area, as obviously limited by the folding process for the second fold 120 which tends to cover up the second side 104 during the travel of the backing sheet 100 towards folders 44. The applicator devices 50 do not have to spray the tacky substance onto the entire defined area, but rather can, for example, spray a narrow strip within the defined area, or can spray in short bursts to form intermittent patches of tacky substance, or can be sprayed in any other pattern or manner desired. The applicator devices 50 can be provided with conventional height positioning devices (not depicted) and associated control devices for raising and lowering the sprayers 52 to thereby control the width of the stream of tacky substance being applied to the backing sheet 100, such as by mounting the sprayers 50 on a motorized jack screw. Additionally, the applicator devices 50 can be configured with devices for controlling the lateral positioning of the sprayers 52 with respect to the edge 106 of the backing sheet 100. Note that the applicator device of the present invention could be configured to apply a layer of the tacky substance over the entire or substantially the entire width of the second side 104 of the backing sheet 100, although this method of application would allow the tacky substance to adhere to any rollers or conveyors positioned downstream of the applicator device, such as a heated roller 32.

FIG. 2 depicts an embodiment including a layer 130 of the tacky substance sandwiched between the first portion 122 and the second portion 124 of the second side 104 of the backing sheet 100. Preferably the tacky substance is sprayed onto both the first portion 122 and the second portion 124 of the second side 104, such that when the second fold 120 is formed the tacky substance on the first portion 122 adheres to the tacky substance on the second portion 124. Alternatively, the tacky substance can be sprayed on only the first portion 122, such that the tacky substance on the first portion 122 adheres directly to the second portion 124, or the tacky substance can be sprayed on only the second portion 124, such that the tacky substance on the second portion 124 adheres directly to the first portion 122.

In the preferred embodiment, the tacky substance used is a starch solution, for example, Borated Dextrin (product number 13-1547) manufactured by National Starch and Chemical Company of Bridgewater, N.J. Alternative materials can be used for the tacky substance such as various adhesive material, however, the material used should preferably be non-abrasive to the hands of a worker handling the insulation, and aesthetically pleasing in the sense that the material does not discolor the backing sheet and is preferably undetectable to the eye. The material used should provide at least a minimal level of adhesion between the stapling tab and the adjacent portion of the backing sheet such that the stapling tab remains fixed to the adjacent portion of the backing sheet during manufacturing and packaging, yet is not permanently fixed to adjacent portion of the backing sheet such that the installer of the insulation can easily unfold the second fold thereby opening the stapling tabs during installation. FIG. 2 depicts the tabs 105 in the open position in phantom lines, and in the closed position in solid lines. The starch solution is preferably diluted, for example, a preferred starch solution includes about one part Borated Dextrin to about three parts water. The starch solution provides a sharp crease along the second fold 120, adheres the stapling tab 105 to the adjacent portion of the backing sheet 100, and gives the stapling tab added rigidity. The starch solution can be mixed using other ratios of starch to water, or can be made using one hundred percent starch, however, higher concentrations of starch will increase the likelihood that the nozzle 52 of the applicator device 50 will become clogged. The concentration of starch in the starch solution can be varied depending upon the length of the assembly line used during the manufacturing and packaging of the insulation, and the length of time the insulation is handled during manufacturing and packaging. If the insulation is going to be frequently handled for a long period of time after the second fold 120 is formed, then a higher concentration of starch in the starch solution will be required in order to insure that the stapling tab 105 remains fixed to the adjacent portion of the backing sheet 100 during the manufacturing and packaging process.

The tacky substance should be sprayed in a manner that provides that the tacky substance remains tacky during the second, and typically final, fold 120. However, the amount of starch solution applied to the backing sheet 100 should not be excessive, since the solution should dry shortly after the second fold 120 is complete. The amount of starch solution being sprayed depends upon the desired level of fixation between the stapling tab and the adjacent portion of the backing sheet, and on the line speed of the assembly line (i.e. the speed at which the backing sheet is being fed along the assembly line). If the starch solution does not dry quickly after the second fold 120 is complete, the second fold 120 will be at risk of opening. Additionally, if the starch solution does not dry until after the packaging of the insulation, then the starch solution may stick to the packaging materials and hamper the packaging process. The use of a heated roller 32 after the folders 44 perform the second fold 120 will help insure that the starch solution is dried and set during the remainder of the manufacturing and packaging process.

The heated roller 32 not only helps dry the tacky substance following the folding of the stapling tab 105, but it also reheats the adherent layer 108 on the first side 102 of the backing sheet 100. By reheating the adherent layer 108, the adherent is prepared for mating and sticking to the fiberglass material 12. The fiberglass material 12 is fed along a conveyor belt system 14 to a location above the backing sheet 100, as the backing sheet 100 passes over the heated roller 32. The fiberglass material 12 is positioned on top of the first side 102 of the backing sheet 100 such that the adherent layer 108 joins the fiberglass material 12 to the backing sheet 100 to form the fiberglass insulation. The fiberglass insulation continues along a conveyor system 16 towards any further manufacturing process areas and packaging areas.

FIG. 3 depicts a partial front view of a roller applicator device of a second embodiment of a system and method of manufacturing a backing sheet according to the present invention. The second embodiment depicted in FIG. 3 is identical to the first embodiment depicted in FIGS. 1A through 1C, except as described below. The second embodiment of the system and method depicted in FIG. 3 can be used to produce, for example, the embodiment of a backing sheet 100 depicted in FIG. 2.

In the second embodiment, the sprayer applicator devices 50 of the first embodiment is replaced with a roller applicator device 60 positioned above both edges of the backing sheet 100. The applicator device 60 is configured to apply a tacky substance to a portion of a second side 104 of the backing material 100 in a similar manner to the sprayer applicator device of the first embodiment.

The applicator device 60 is configured to apply the tacky substance to the backing material 100 at a location between the first pair of folders 40 and the second pair of folders 44, and preferably downstream of any additional rollers that might be positioned between folders 40 and folders 44. The present invention preferably includes a pair of applicator devices 60, one for each edge of the backing sheet 100. The applicator devices 60 include a roller 62 configured to rotate on an axle 64. The roller 62 can be configured as a hollow perforated cylinder with a supply tube extending within the axle 64, which supplies the tacky substance to the interior of the perforated cylinder such that the tacky substance can flow out the perforations to the exterior of the cylinder and be applied to the backing sheet 100 by contacting the roller 62 to the backing sheet 100. The applicator devices 60 can also include a filter in series with the roller 62 and can be configured to utilize compressed air as a means for forcing the tacky substance out of the roller. As will be readily apparent to one of ordinary skill in the art, the applicator device 60 can be configured with alternative means for supplying the tacky substance to the roller 62. The roller 62 preferably provides a uniform distribution of tacky substance on the backing sheet 100. The applicator device 60 is preferably configured to roll a layer of the tacky substance onto the second side 104 of the backing sheet 100 within the defined area described in the first embodiment as being defined by a predetermined width $w_3$ in from the edge of the first fold 110 of the backing sheet 100, and generally in the distance d between the folders 40 and the folders 44. The applicator devices 60 can be provided with conventional height positioning devices (not depicted) and associated control devices for raising and lowering the rollers 62 to thereby control the duration of contact between the rollers 62 and the backing sheet 100, such as by mounting the rollers 62 on a motorized jack screw. Additionally, the applicator devices 60 can be configured with devices for controlling the lateral positioning of the rollers 62 with respect to the edges 106 of the backing sheet 100.

FIGS. 4A through 4C depict a third embodiment of a system and method of manufacturing a backing sheet according to the present invention. The third embodiment depicted in FIGS. 4A through 4C is identical to the first embodiment depicted in FIGS. 1A through 1C, except as described below. FIG. 5 depicts is an alternative embodiment of a backing sheet 100 according to the present invention, which can be produced, for example, by the system and method depicted in FIGS. 4A through 4C.

The third embodiment of the system and method of manufacturing a backing sheet includes a piecing device 70 configured to piece a hole 140 through the backing sheet 100 in order to allow a portion of adherent material in the adherent material layer 108 to leak through the hole 140 and contact a portion of the backing sheet 100. The hole 140 is pierced by punching or cutting a portion of material from the backing sheet 100 to form the hole 140, or by poking a sharp point through the backing sheet 100 without removing any material or only slightly removing some material from the backing sheet 100. The piercing of the hole 140 can be accomplished using a variety of alternative types of piecing devices, one embodiment of which will be described below.

Preferably the piercing device 70 is located upstream in the system of the roller 26, therefore, as the backing sheet 100 travels over the roller 26, adherent material 24 applied to the first side 102 of the backing sheet 100 will seep or leak through the hole 140 and a portion 150 of the adherent material will extend slightly above the second side 104. The hole 140 is configured to be located within the area defined by a predetermined width $w_3$ in from the edge of the first fold 110 of the backing sheet 100. The hole 140 preferably extends through the backing sheet 100 at a position coincident with the second portion 124 of the second side 120 and opposite the first portion 122 of the second side 120, however, alternatively the hole 140 can extend through the backing sheet 100 at a position coincident with the first portion 122 of the second side 120 and opposite the second portion 124 of the second side 120. Once the second fold 120 is made, the portion 150 of adherent material will contact a portion of the backing sheet 100. For example, in the embodiment of the backing sheet 100 depicted in FIG. 5 the portion 150 of the adherent material extends through a hole 140 in the backing sheet 100 and contacts the first portion 122 of the second side 120 of the backing sheet 100. The portion 150 of the adherent material will adhere to the portion of the backing material 100 it contacts and thereby prevent the stapling tab 105 from opening during the remaining manufacturing and packaging processes.

The piercing device 70 of the third embodiment includes a solenoid 72 having a extendible and retractable projection 74. The solenoid 72 is electrically controlled to extend the projection 74 outward from the solenoid 72 and through the backing sheet 100 and retract the projection 74 back towards the solenoid 72 in an intermittent and rapid manner to pierce a hole 140 in the backing material 100. The piercing device 70 preferably includes a plate 80 having a hole 82 configured to receive the projection 74 and thereby aid in the piercing of the hole 140. The projection 74 can be formed with a tip 76 that is either in the form of a sharp point, thereby facilitating the poking of a hole 140 generally without removing material from the backing sheet 100, or in the form of a wider punch-like end, thereby facilitating the punching or cutting and removal of a portion of material from the backing sheet 100. Alternatively, the projection 74 can be driven using mechanical means (not depicted), or the piecing device can be configured, for example, as a rotating roller (not depicted) having one or more projections radially extending therefrom that pierce holes in the backing sheet 100 as the backing sheet 100 travels past the rotating roller.

The size of the holes 140 and the frequency of holes 140 formed in the backing sheet 100 are dependent upon the length of the assembly line used during the manufacturing and packaging of the insulation, and the length of time the insulation is handled during manufacturing and packaging. If the insulation is going to be frequently handled for a long period of time after the second fold 120 is formed, then more frequent holes 140 or larger holes 140 will be required in order to insure that the stapling tab 105 remains fixed to the adjacent portion of the backing sheet 100 during the manufacturing and packaging process.

The third embodiment generally does not include an applicator device as described in the first and second embodiments, however, an embodiment can be constructed that combines an applicator device with the piercing device described in the third embodiment.

Numerous variations of the present invention are possible in light of the above teachings. It is therefore to be understood that within the scope of the appended claims, the present invention can be practiced other than as specifically described herein.

What is new and desired to be secured by Letters Patent of the United States is:

1. A backing sheet for insulation, said backing sheet comprising:
    a front side having an adherent material thereon;
    a back side;
    a stapling tab extending along an edge of said backing sheet, said stapling tab having a first portion of said back side positioned against a second portion of said back side; and
    at least one hole extending through said backing sheet such that a portion of said adherent material extends through said at least one hole and contacts said back side.

2. The backing sheet according to claim 1, wherein said stapling tab comprises:
    a first fold extending along an edge of said backing sheet, said first fold having a first portion of said front side positioned against a second portion of said front side; and
    a second fold extending along the edge of said backing sheet contiguous with said first fold, said second fold having said first portion of said back side positioned against said second portion of said back side.

3. The backing sheet according to claim 1, wherein said stapling tab comprises:
    a first fold extending along an edge of said backing sheet, said first fold having a first portion of said front side bonded to a second portion of said front side by said adherent material.

4. The backing sheet according to claim 1, wherein said portion of said adherent material extending through said at least one hole bonds said first portion of said back side to said second portion of said back side.

* * * * *